US012631942B2

(12) United States Patent
Padurariu et al.

(10) Patent No.: US 12,631,942 B2
(45) Date of Patent: May 19, 2026

(54) CAMERA ASSEMBLY COMPRISING A ROTATION BLOCKING PIN

(71) Applicant: Magna Electronics Sweden AB, Vargarda (SE)

(72) Inventors: Catalin Padurariu, Iasi (RO); Adrian Homutescu, Iasi (RO)

(73) Assignee: Magna Electronics Sweden AB, Vårgårda (SE)

( * ) Notice: Subject to any disclaimer, the term of this patent is extended or adjusted under 35 U.S.C. 154(b) by 413 days.

(21) Appl. No.: 18/250,160

(22) PCT Filed: Oct. 21, 2021

(86) PCT No.: PCT/EP2021/079183
§ 371 (c)(1),
(2) Date: Apr. 21, 2023

(87) PCT Pub. No.: WO2022/084439
PCT Pub. Date: Apr. 28, 2022

(65) Prior Publication Data
US 2024/0004269 A1      Jan. 4, 2024

(30) Foreign Application Priority Data
Oct. 23, 2020      (EP) ..................................... 20203569

(51) Int. Cl.
*G03B 17/12*      (2021.01)
(52) U.S. Cl.
CPC .................................... *G03B 17/12* (2013.01)

(58) Field of Classification Search
CPC ........ G03B 17/12; G03B 30/00; G02B 7/022; G02B 7/026; H04N 23/55
(Continued)

(56) References Cited

U.S. PATENT DOCUMENTS

2005/0104995 A1      5/2005   Spryshak et al.
2009/0110385 A1      4/2009   Toor et al.
(Continued)

FOREIGN PATENT DOCUMENTS

CN      106739636 B    * 12/2018    ............. B42F 13/20
CN      110351469 A     10/2019
(Continued)

OTHER PUBLICATIONS

International Search Report and Written Opinion of PCT/EP2021/078517, mailed Feb. 25, 2022.

*Primary Examiner* — William R Alexander
*Assistant Examiner* — Alaina Marie Swanson
(74) *Attorney, Agent, or Firm* — DICKINSON WRIGHT PLLC

(57)      ABSTRACT

A camera assembly (10) and method for assembling a camera assembly (10). The camera assembly (10) has a camera housing (11) and a printed circuit board (13) attached to the camera housing (11). An optical sensor (14) is part of the printed circuit board (13). A lens barrel (12) is axially surrounded by the camera housing (11) and mounted in the camera housing (11) such that a defined airgap (20) between the lens barrel (12) and the optical sensor (14) is set. A rotation-blocking pin (25), inserted in the at least one bore (23) of the camera housing (11), is in force-fitting contact with a side portion (22) of the lens barrel (12).

17 Claims, 8 Drawing Sheets

(58) Field of Classification Search
USPC ......................................................... 359/819
See application file for complete search history.

(56) References Cited

U.S. PATENT DOCUMENTS

| 2017/0307841 | A1 * | 10/2017 | Nakamura | ............. H04N 23/55 |
| 2021/0037172 | A1 | 2/2021 | Deng et al. | |

FOREIGN PATENT DOCUMENTS

| JP | H07134335 | A | * | 5/1995 |
| KR | 101346909 | B1 | | 1/2014 |

* cited by examiner

CAMERA ASSEMBLY COMPRISING A ROTATION BLOCKING PIN

CROSS-REFERENCE TO RELATED APPLICATIONS

This application is a 35 U.S.C. § 371 national phase of PCT International Application No. PCT/EP2021/079183, filed Oct. 21, 2021, which claims the benefit of priority under 35 U.S.C. § 119 to European Patent Application No. 20203569.7, filed Oct. 23, 2020, the contents of which are incorporated herein by reference in its entirety.

FIELD OF THE INVENTION

The invention relates to a camera assembly. In particular, the camera assembly comprises a camera housing and a printed circuit board carrying an optical sensor. The printed circuit board is attached to the camera housing. A lens barrel is axially surrounded by the camera housing and mounted in the camera housing such that a defined airgap between the lens barrel and the optical sensor is set.

Furthermore, the invention relates to a method for assembling a camera assembly. In particular, the camera assembly comprises a camera housing with an attached printed circuit board which carries an optical sensor. A lens barrel is mounted such that a defined airgap between the lens barrel and the optical sensor is set.

DESCRIPTION OF THE BACKGROUND ART

European patent application EP 3 410 687 A1 discloses a camera module for a motor vehicle. The camera comprises at least one printed circuit board and a shield for enclosing said printed circuit board. The shield comprises at least a first shielding part and a second shielding part. The first shielding part encloses the second shielding part. The second shielding part comprises a hole allowing light to enter the camera module and allowing the lens objective to extend through the hole.

German patent application DE 10 2018 004 978 A1 discloses a camera comprising a housing, a circuit board, an image sensor attached to the circuit board, an optical device, and two positioning pins for aligning the image sensor with the optical device. The two positioning pins are aligned in a predetermined position relative to the housing. A positioning element in addition to the circuit board being aligned in a predetermined position relative to the two positioning pins and the image sensor is aligned in a predetermined position to the positioning element.

International patent application WO 2018/219951 A1 relates to a camera module for a motor vehicle. The camera module is used for driver monitoring in the passenger compartment. The camera module has at least one printed circuit board and a shield for enclosing said printed circuit board.

U.S. patent application US 2019/208091 A1 discloses a camera module for a vehicular vision system. The camera module includes a metal front housing, a lens holder and a metal rear housing. The front housing houses a printed circuit board having an imager disposed thereat. The lens holder is attached at a front portion of the housing so that a lens assembly is optically aligned with the imager.

German patent application DE10 2018 001 552 A1 discloses a camera with a housing, a circuit board, an image sensor attached to the circuit board, an optical device, and a positioning element for aligning the image sensor with the optical device. The image sensor is aligned with the positioning element by means of balls in a gap due to the diameter of the balls in the predetermined position in that the balls are arranged between the image sensor and the positioning element in the gap.

German patent application DE10 2016 124 668 A1 relates to a device for orientation of an optical unit of a camera. The device includes adjustment means, the actuating part of which is operatively connected to a supporting part of the optical unit. The actuating part is arranged outside the housing and the supporting part is arranged inside the housing. The actuating part and the supporting part each comprise a diametrically magnetized magnet at least on their mutually facing sides.

German patent application DE10 2016 007 627 A1 relates a camera with a housing and a first printed circuit board and image sensor attached to the printed circuit board. A second circuit board defines a second carrier for at least one electronic component. A cooling wall is connected to the at least one electronic component in a thermally conductive manner for dissipation of waste heat from the at least one electronic component into the environment.

German patent application DE 10 2014 008 452 A1 discloses a camera with a camera housing which has a housing middle part, which is closed at open end faces of the housing middle part opposite to each other by means of covering parts. One of the covering parts has an objective retainer for an objective of the camera. An image-recording sensor assembly is arranged behind the objective retainer in an interior of the camera housing, wherein at least one of the covering parts has at least one fastening projection, which extends through the housing middle part or past the housing middle part to a fastening receptacle of the other covering part. The at least one fastening projection is connected to the covering part having the fastening receptacle by means of fasteners in a tension-resistant manner with respect to a longitudinal axis of the camera housing extending between the end faces of the housing middle part.

In general, vision cameras are more and more present in vehicles. An important feature, in prior art camera assemblies, is the adjustment of an airgap between the lens barrel and optical sensor. The lens barrel is lowered towards the optical sensor until the optimal distance is reached. This is necessary because the relative position of the lens barrel and the optical sensor is subject to a variation that occurs after the assembly step. Any variation (deviation) greater than what is acceptable for optical purposes makes a camera assembly unsuitable for use.

The problems with the current prior art reside in the fact that a tension provided by an O-ring is not constant from camera to camera, since due to variable adjustments, the tension provided by the O-ring is not constant over time on one camera, which is in turn due to material aging. Moreover, the installation of the O-ring inside the camera housing is difficult and the correct position of the O-ring inside the camera housing after installation cannot be checked visually.

SUMMARY OF THE INVENTION

It is an object of the present invention to provide a camera assembly, which is robust against changes of the optical set-up over time, allows inspection after installation, is easy to mount and demount, and even allows easy correction of improper installation at any given time after initial manufacturing of the camera assembly.

The above object is achieved by a camera assembly, accordance with embodiments described herein.

It is a further object of the invention to provide a method for assembling a camera assembly, which allows easy mounting and demounting, allows inspection after installation, is more robust against changes of the optical set-up over time and even allows easy correction of improper installation at any given time after initial manufacturing of the camera assembly.

The above object is achieved by a method for assembling a camera assembly with a camera housing which comprises the features in accordance with embodiments described herein.

According to an embodiment of the invention, a camera assembly is composed of a camera housing and a printed circuit board attached to the camera housing. The printed circuit board carries an optical sensor. A lens barrel is axially surrounded by the camera housing and mounted in the camera housing such that a defined airgap between the lens barrel and the optical sensor is set. In order to keep the optimal set between the lens barrel and the optical sensor, at least one bore is formed in the camera housing. The bore defines a window to the lens barrel. A rotation-blocking pin is inserted in the at least one bore. Through the window, the rotation-blocking pin is in at least a force-fitting contact with a side portion of the lens barrel.

Preferably, at least the fins of the rotation-blocking pin are made from a soft, elastic material. The advantage of the camera assembly is that with the introduction of the soft, elastic rotation-blocking pin, the rotation-blocking pin takes up the functions of the removed O-ring in the prior art camera assemblies. Therefore, the camera assembly of the present invention is more robust and hence less prone to significant changes by aging with respect to the airgap between the lens barrel and the optical sensor. An inspection after installation is possible. A further advantage of the inventive camera assembly is, an easy correction of improper installation at any given time after initial manufacturing of the camera assembly is possible. The correction is possible without consequences like destruction and replacement of any component. Depending on the material used for the rotation-blocking pin, the rotation-blocking pin's blocking force preventing rotation of the lens barrel can be selected.

According to an embodiment of the invention, the at least one bore defines a first end and a second end. Through the first end, the rotation-blocking pin is inserted. The bore hole may be closed with a bottom at the second end. The bore hole may be a blind bore. On the other hand, the bore may be, with the first end and the second end, a through-hole.

According to an embodiment of the invention, at least one spreading wedge is formed inside a wall of the bore. Preferably, the spreading wedge is formed at or close to the second end of the bore.

The special embodiment has the advantage that when the rotation-blocking pin is reaching the end of its insertion travel, the wedges spread the shaft of the rotation-blocking pin. Thus, the at least on wedge serves for an initial easy insertion. At the end of the travel, the insertion force rises steeply so that the rotation-blocking pin is secured into position.

According to an embodiment of the rotation-blocking pin, the rotation-blocking pin has a solid shaft and a plurality of flexible fins. The flexible fins are arranged axially along the shaft. Each flexible fin defines an inner airgap in the unassembled stance of the rotation-blocking pin with the camera housing. In the mounted stance of the rotation-blocking pin with the camera housing, the flexible fins exert a radial blocking force against the lens barrel and against the camera housing.

According to a further embodiment of the rotation-blocking pin, the rotation-blocking pin is formed as a split shaft. The split shaft has at least two lobes and a plurality of flexible fins. The flexible fins are arranged axially above the lobes of the split shaft and each flexible fin defines an inner airgap and each lobe defines a lobe air gap in the unassembled stance of the rotation-blocking pin with the camera housing. In the mounted stance of the rotation-blocking pin with the camera housing, the flexible fins exert a radial blocking force against the lens barrel and against the camera housing. According to an embodiment, the bore has at its second end at least one wedge for spreading the lobes of the shaft apart when the rotation-blocking pin is fully inserted in the bore.

The advantage of the wedge is that as the rotation-blocking pin is reaching the end of the insertion travel, the lobes of the shaft are spread apart by the at least one special wedge inside the walls of the bore. This specific construction serves for an initial easy insertion of the rotation-blocking pin into the bore of the camera housing. At the end of the travel of the rotation-blocking pin, the insertion force rises steeply so that the rotation-blocking pin is secured into position. If at least one fin is positioned in the bore over the window towards the lens barrel, the assembly is as well tight from below.

In an embodiment of the invention, the rotation-blocking pin is manufactured from a plastic or silicone material.

According to an embodiment of the method of the invention for assembling a camera assembly, the camera assembly is composed at least of a camera housing and a printed circuit board. The printed circuit board carries an optical sensor. The printed circuit board is attached to the camera housing. A lens barrel is axially surrounded by the camera housing and mounted in the camera housing such that a defined airgap between the lens barrel and the optical sensor is set. The steps comprise:

screwing the lens barrel into the camera housing and thereby best positioning the lens barrel in relation to the optical sensor; and inserting a rotation-blocking pin into at least one bore formed in the camera housing, wherein the bore defines a window to the lens barrel, and wherein the fully inserted rotation-blocking pin is at least in a force-fitting contact with a side portion of the lens barrel.

The advantage of the inventive solution is that the rotation-blocking pin, in relaxed a relaxed condition, gets into interference with the lens barrel. The airgaps inside the rotation-blocking pin are closing, while a radial blocking force is exerted, pushing the lens barrel tight against the camera housing.

For balancing the radial force exerted on the lens barrel, two rotation-blocking pins (or more) can be used, which are disposed in a radial pattern around the lens barrel. The radial force necessary for moving the rotation-blocking pin can be easily tuned by tweaking the material of rotation-blocking pin. The tuning parameters are: the nominal size of the airgap of the flexible fins, nominal size of airgap between the lobes, the thickness of fins, the thickness of shaft or the general diameter of shaft. The blocking force can be easily established at 2 or 3 times above minimal requirement, so that material aging cannot affect the safe fixation position.

In an embodiment where the blocking pin is made of a soft material, the housing and lens barrel are made of a stiff material like common metals. The need of at least one counter pin as balancing element for radial force is reduced or even annulled.

The use of the inventive camera assembly in a driver monitoring system is one example and should not be regarded as a limitation of the present invention. There are many possible uses of the inventive camera assembly in any type of vehicle in various application or even in any industry applications.

BRIEF DESCRIPTION OF THE DRAWINGS

The numerous advantages of the disclosure may be better understood by those skilled in the art by reference to the accompanying figures in which.

DETAILED DESCRIPTION

Figure 1:
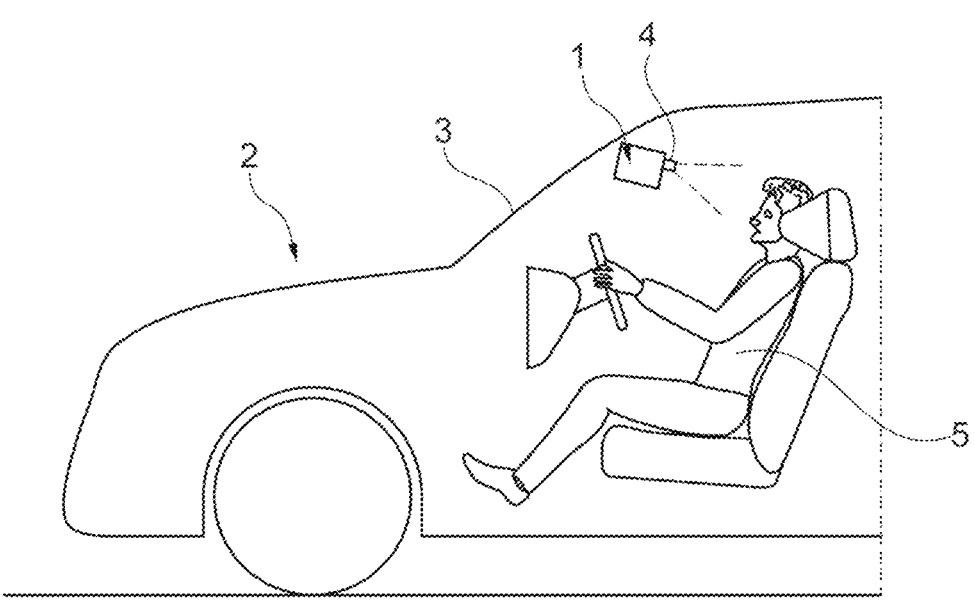
FIG. 1 is a schematic representation of the placement of a driver monitoring system camera according to an embodiment of the prior art.

In the ensuing description, numerous specific details are provided to enable maximum understanding of the embodiments that are provided by way of example. The embodiments may be implemented with or without specific details, or else with other methods, components, materials, etc. In other circumstances, well-known structures, materials, or operations are not illustrated or described in detail so that various aspects of the embodiments will not be obscured.

Reference in the course of the present description to "an embodiment" or "one embodiment" means that a particular structure, peculiarity, or characteristic described in connection with its implementation is comprised in at least one embodiment. Hence, phrases such as "in an embodiment" or "in one embodiment" that may recur in various points of the present description do not necessarily refer to one and the same embodiment. Furthermore, the particular structures, peculiarities, or characteristics may be combined in any convenient way in one or more embodiments.

Same reference numerals refer to same elements or elements of similar function throughout the various figures. Furthermore, only reference numerals necessary for the description of the respective figure are shown in the figures. The shown embodiments represent only examples of how the invention can be carried out. This should not be construed as a limitation of the invention.

FIG. 1 shows a schematic representation of an arrangement of a driver monitoring system 1 inside a motor vehicle 2 according to an embodiment of the prior art. The driver monitoring system 1 is mounted, for example, at or close to a windshield 3 of the motor vehicle 2, so that at least one camera assembly 10 (see FIG. 2) of driver monitoring system 1 is looking at a driver 5 of the motor vehicle 2. In particular, a lens 4 of camera assembly 10 is pointing at the driver 5.

Figure 2:
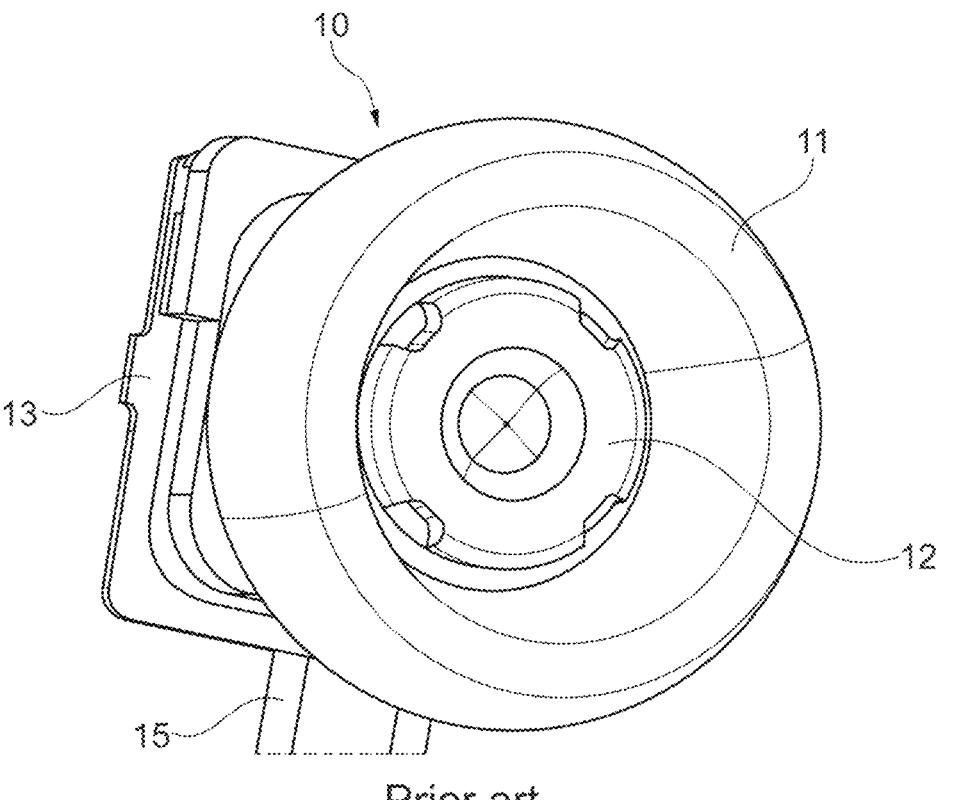
FIG. 2 is a perspective view of a prior art camera assembly.

FIG. 2 is a perspective view of a prior art camera assembly 10. A camera housing 11 surrounds a lens barrel 12 axially. It is noted that the exterior shape of camera housing 11 (presented in the accompanied figures) shows one possible example and should in way be regarded as a limitation of the invention. A printed circuit board 13, which carries an optical sensor 14 (see FIG. 3), is mounted to the camera housing 11. A data cable 15 connects the printed circuit board 13 with an evaluation and control unit (not shown).

Figure 3:
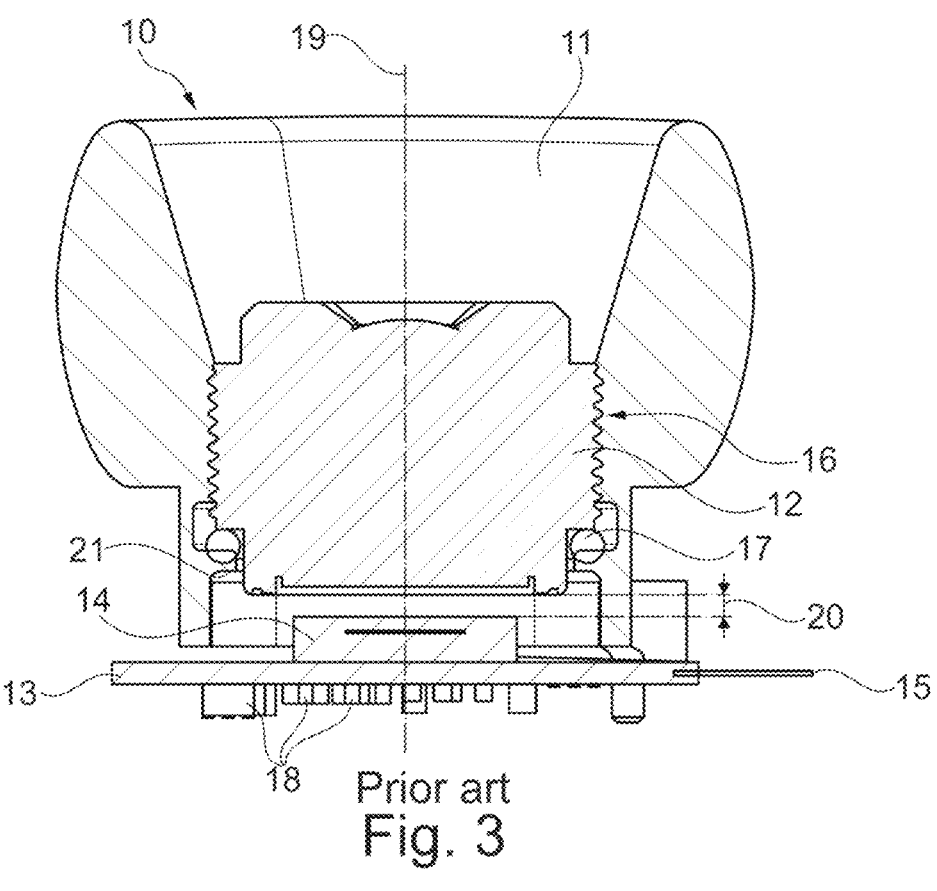
FIG. 3 is a cross-section view in axial direction through the centre of the camera assembly shown in FIG. 2.

FIG. 3 is a cross-section view in axial direction through the center of the prior art camera assembly 10 shown in FIG. 2. The camera housing 11 surrounds the lens barrel 12. The printed circuit board 13, carrying the optical sensor 14, is attached to the camera housing 11. In the embodiment shown, printed circuit board 13 carries further electronic components 18. The lens barrel 12 defines an optical axis 19 which is, in the mounted stage of the lens barrel 12, perpendicular to the optical sensor 14. In order to provide a proper imaging by optical sensor 14, an airgap 20 between lens barrel 12 and optical sensor 14 needs to be adjusted. In order to achieve the required airgap 20, lens barrel 12 and camera housing 11 feature a thread 16 which allows travel of the lens barrel 12 towards or away from the optical sensor 14 until the optimal and required airgap 20 is reached. An O-ring 17 is sitting on a radial rim 21 and is exposed to a certain tension once lens barrel 12 has reached, due to a rotational movement of lens barrel 12, an optimal and required airgap 20 with the optical sensor 14. The axial tension (along the optical axis 19) of O-ring 17 should stabilize the airgap 20 between lens barrel 12 and optical sensor 14 and thus prevent accidental rotation of the lens barrel 12 relative to the camera housing 11. A secondary function of the O-ring 17 is to ensure tightness between the optical sensor 14 on the printed circuit 13 and the outside of camera assembly 10.

There are some problems of current prior art camera assemblies 10 mentioned above. The tension provided by O-ring 17 is not constant from camera to camera which results in a variable adjustment and mounting of camera assembly 10. Additionally, the tension provided by O-ring 17 on lens barrel 12 is not constant over time due to material aging. Moreover, the installation of O-ring 17 inside camera housing 10 is difficult and the correct position of O-ring 17 inside camera housing 11 after installation cannot be checked visually.

Figure 4:
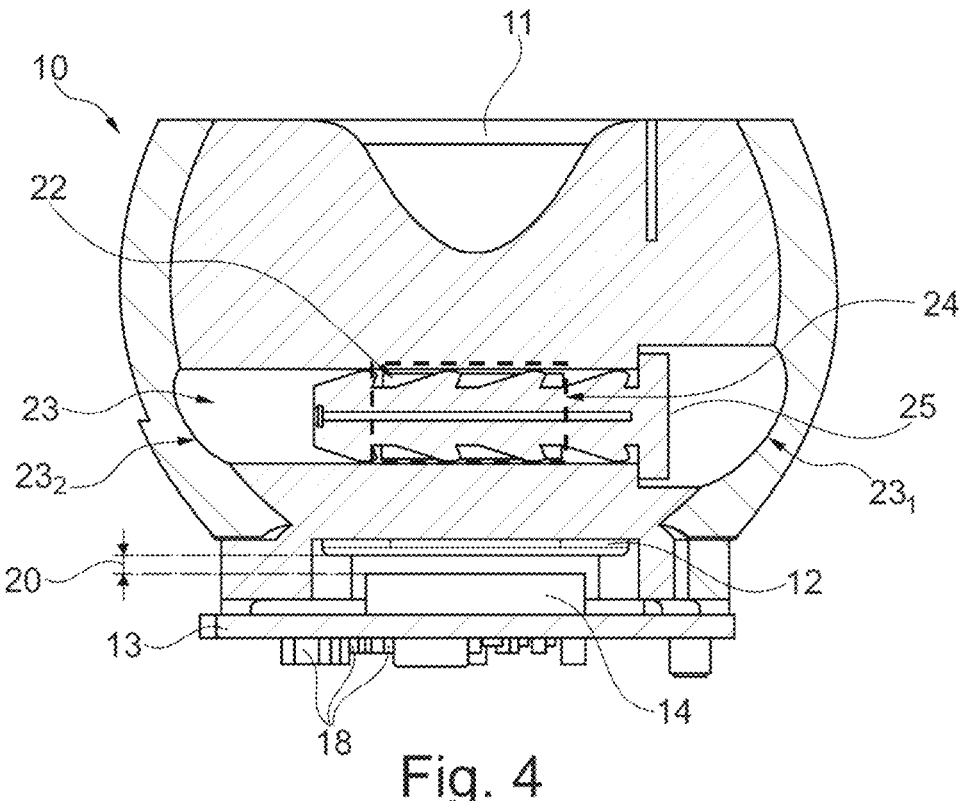
FIG. 4 is an off-center sliced view of the camera assembly according to the present invention.

FIG. 4 is an off-center sliced view of the camera assembly 10 according to an embodiment of the present invention. A bore 23 is formed in camera housing 11. In the embodiment shown here, bore 23 is a through-hole which defines a first open end 23$_1$ and a second open end 23$_2$ in camera housing 11. The bore 23 can receive a rotation-blocking pin 25. In the embodiment of FIG. 4, rotation-blocking pin 25 is inserted in bore 23 and in contact with a side portion 22 of lens barrel 12. The placement of bore 23 is such that a window 24, shown as a dashed line in FIG. 4, is formed, through which the side portion 22 of lens barrel 12 can be reached by rotation-blocking pin 25. The contact between rotation-blocking pin 25 and lens barrel 12 block a rotation of lens barrel 12. Thus, the rotation-blocking pin 25 is able to stabilize the airgap 20 between lens barrel 12 and optical sensor 14 and thus prevents accidental rotation of lens barrel 12 relative to camera housing 11. According to a preferred embodiment, rotation-blocking pin 25 is soft and elastic, for example made from a polymer material.

Figure 5:
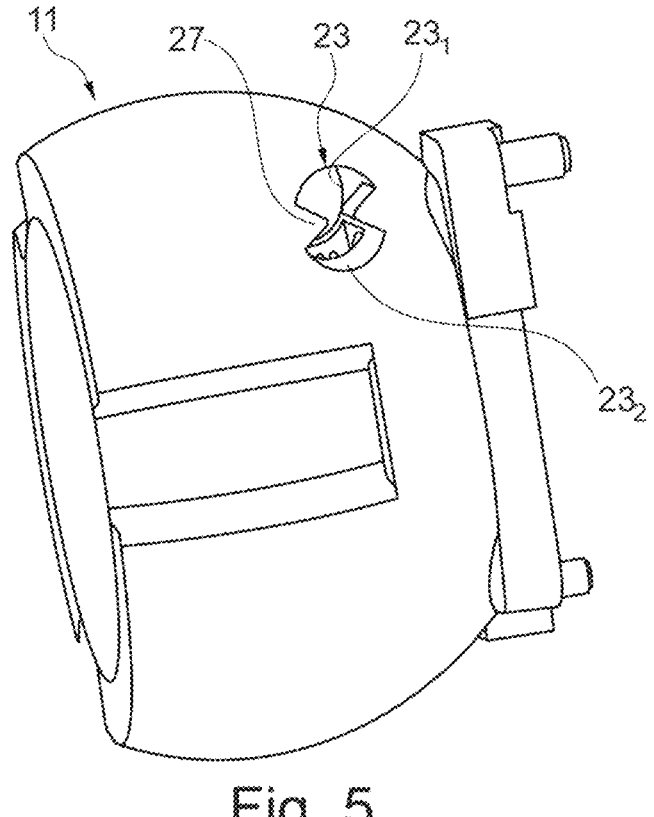
FIG. 5 is a perspective side view of the housing of the camera assembly according to the present invention.
Figure 6:
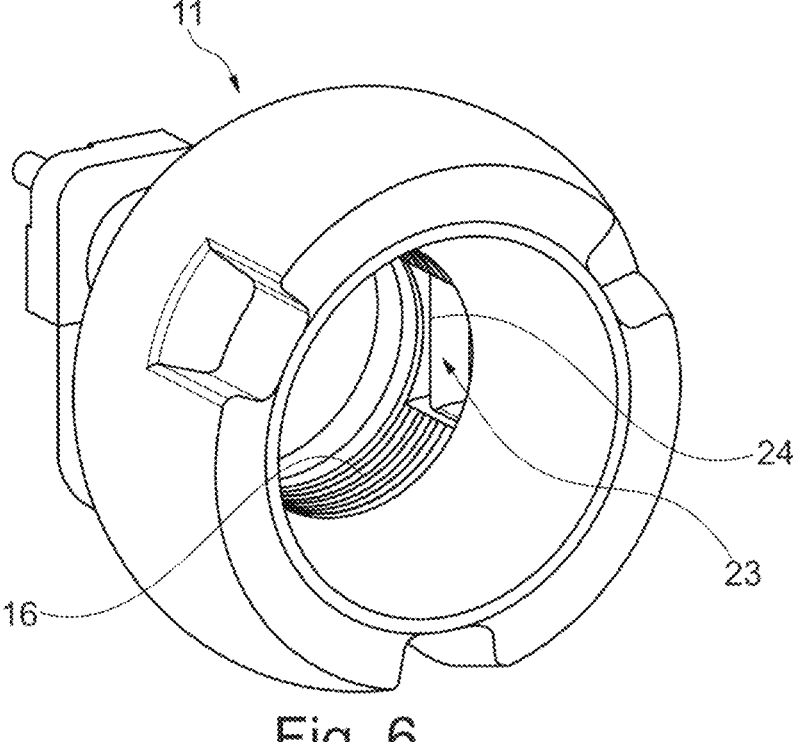
FIG. 6 is a perspective front view of the housing of the camera assembly according to the present invention.

FIG. 5 is a perspective side view of the camera housing 11 for the camera assembly 10 according to an embodiment of the present invention. The camera housing 11 has, as mentioned in the description of FIG. 4, a bore 23 formed, which is generally parallel to optical axis 19 (see FIG. 3) of lens barrel 12. In the embodiment shown here, bore 23 is a through-hole with a first open end 23$_1$ and a second open end 23$_2$. Furthermore, in the embodiment shown here, bore 23 has at least one wedge 27 formed in camera housing 11, which at least one wedge 27 can cooperate with the rotation-blocking pin 25 (not shown here). FIG. 6 is a perspective front view of camera housing 11 of FIG. 5. Bore 23, as also shown in FIG. 4, has a window 24 (shown here as a solid line) which communicates with thread 16 for lens barrel 12 (not shown here) to be mounted in camera housing 11. Through the window 24, the side portion 22 of lens barrel 12 can be reached by rotation-blocking pin 25 (see FIG. 4). Window 24 partially intersects the cylindrical thread 16 that is housing lens barrel 12. Through this construction principle, it is possible to inspect the correct insertion of rotation-blocking pin and camera housing 11 serves not only to accommodate lens barrel 12, but also to accommodate rotation-blocking pin 25.

Figure 7:
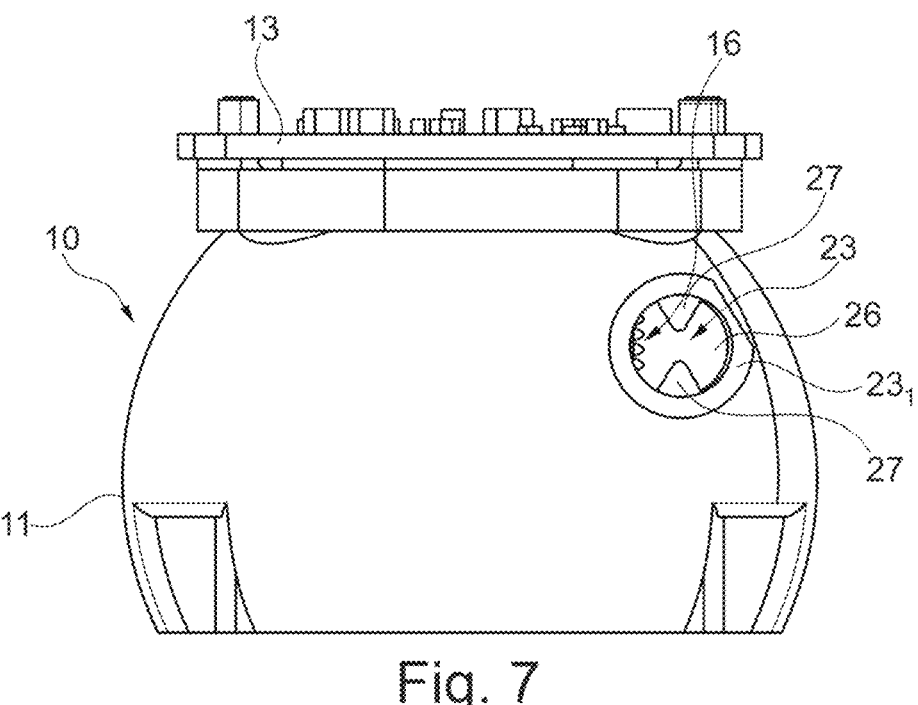
FIG. 7 is a side view of the inventive camera assembly, wherein a rotation-blocking pin is not inserted.

FIG. 7 is a side view of the inventive camera assembly 10, wherein the rotation-blocking pin 25 is not inserted in bore 23. Printed circuit board 13 is mounted to camera housing 11. Trough bore 23, viewing from the first end 23$_1$, one can see thread 16 of camera housing 11. In the embodiment shown here, bore 23 is not a through-hole. Instead, bore 23 is closed by a bottom 26 and features the two wedges 27.

Figure 8:
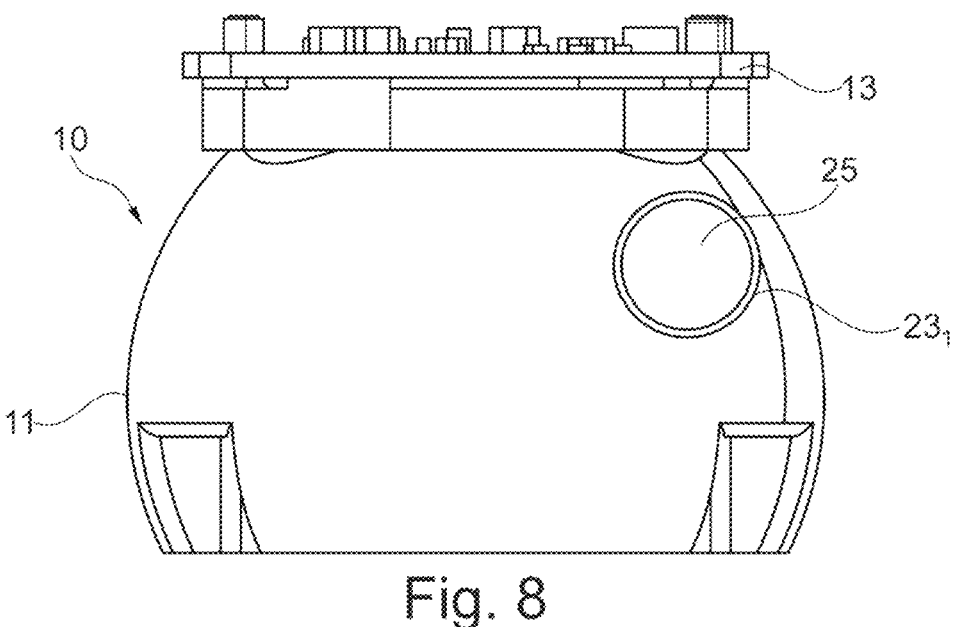
FIG. 8 is a side view of the inventive camera assembly, wherein the rotation-blocking pin is inserted.

FIG. 8 is a side view of inventive camera assembly 10, wherein rotation-blocking pin 25 is inserted in bore 23. The rotation-blocking pin 25 is inserted from the first open end 23$_1$.

Figures 9, 10:
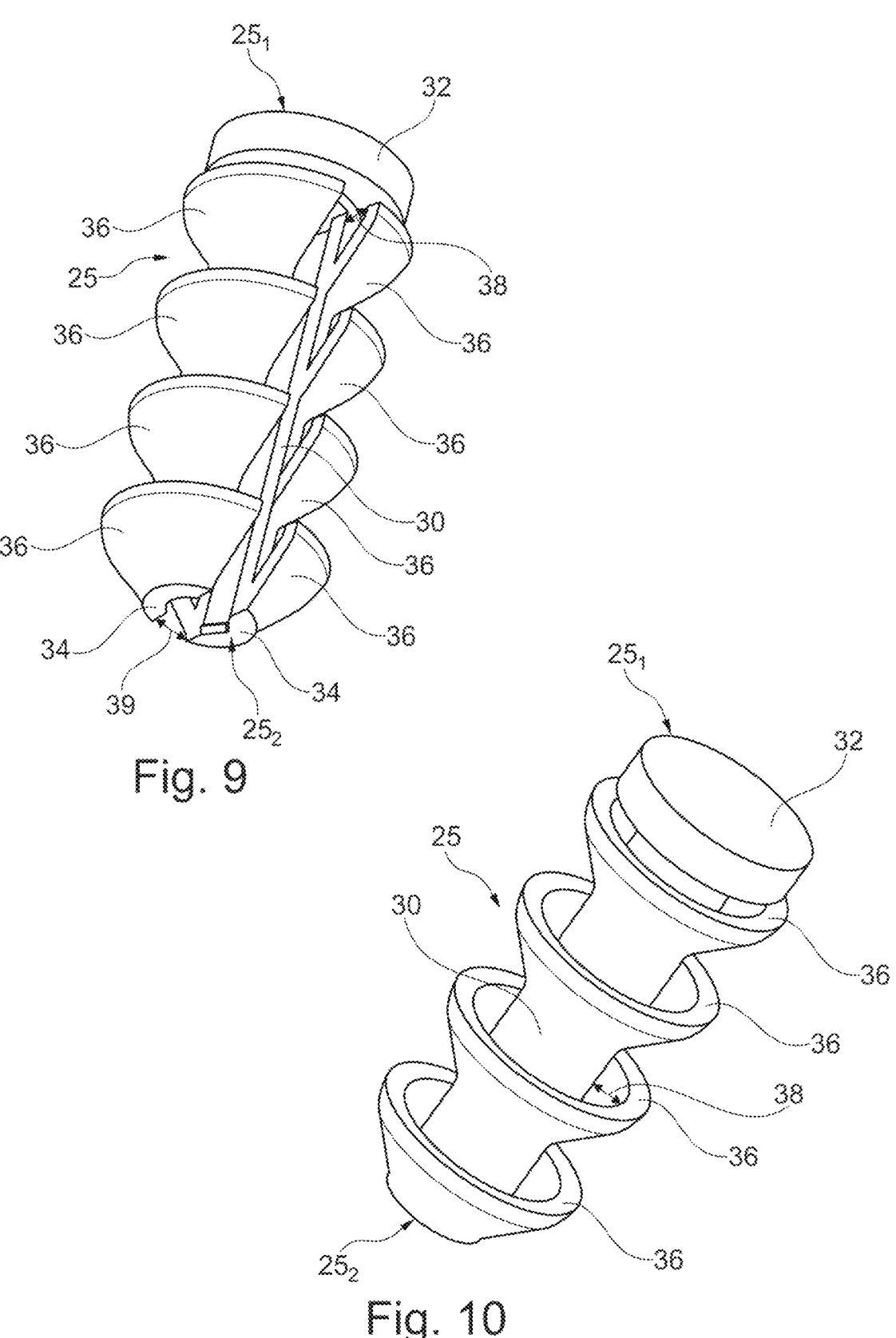
FIG. 9 is a perspective view of an embodiment of the rotation-blocking pin.
FIG. 10 is a perspective view of a further embodiment of the rotation-blocking pin.

FIG. 9 is a perspective view of an embodiment of the rotation-blocking pin Rotation-blocking pin 25 defines a first end 251 and a second end 252. In the embodiment shown here, a shaft 30 of the rotation-blocking pin 25 is split in at least two lobes 34. Each lobe 34 has stacked a plurality of flexible fins 36. At first end 251, the shaft carries a stopper cap 32. When compressed radially, the fins 36 are enclosing the shaft 30, virtually until an inner air gap 38 between the respective flexible fin 36 and shaft becomes zero. The shaft 30 with two lobes 34 is particularly flexible when compressed in a radial direction which is due to a lobe air gap 39 between the respective lobe 34 and shaft 30.

FIG. 10 is a perspective view of a further embodiment of the rotation-blocking pin 25. For the sake of simplicity, shaft 30 is manufactured without lobes (solid shaft). Such a solution ensures a better seal against the penetration of vapours into camera housing 11, which accommodates sensitive elements such as the optical sensor 14. Here as well, when compressed radially, the fins 36 are enclosing the shaft 30, virtually until the inner air gap 38 becomes zero. The rotation-blocking pins 25, as described above, may be manufactured from a wide range of plastic and silicone materials by conventional methods.

Figure 11:
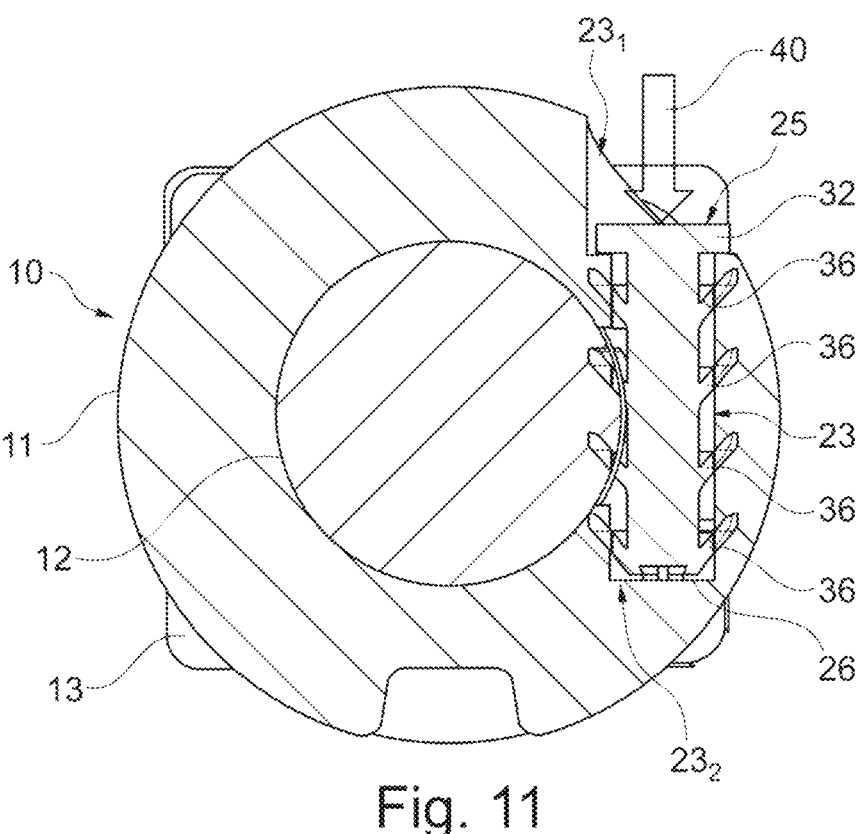
FIG. 11 is a sectional view of the final assembly of the camera assembly, wherein the rotation-blocking pin is in contact with the lens barrel.
Figure 12:
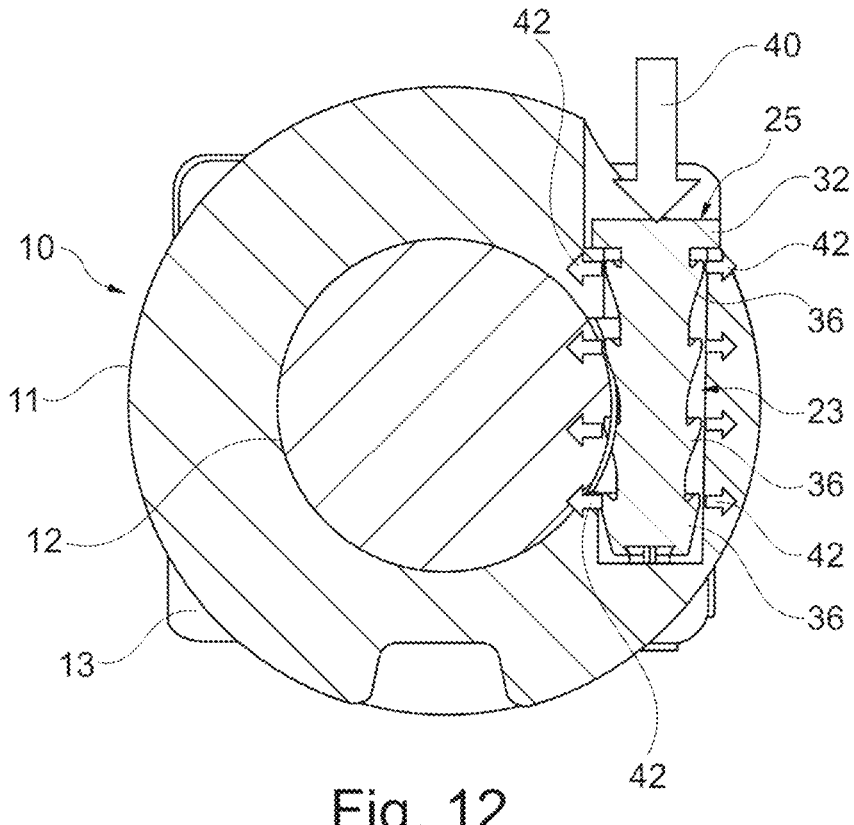
FIG. 12 is a sectional view of the final assembly of the camera assembly, wherein the flexible fins are in contact with the lens barrel.

FIG. 11 is a sectional view of the final assembly of camera assembly 10, wherein the rotation-blocking pin 25 is in contact with the lens barrel 12. FIG. 12 is a sectional view of the final assembly of camera assembly 10, wherein the flexible fins 36 of rotation-blocking pin 25 are in contact with the lens barrel 12.

Camera housing 11 is fixed together with the printed circuit board 13 carrying the optical sensor 14 (see FIG. 4). Lens barrel 12 is inserted, for example screwed, into camera housing 11, wherein this step includes an angular turning for best positioning the lens barrel 12 in relation to the optical sensor 14 (see FIG. 4). Rotation-blocking pin 25 is then inserted inside bore 23 of camera housing 11, starting from the first end 23$_1$ of bore 23 of camera housing 11. In FIGS. 11 and 12, bore 23 is closed at its second end 23$_2$ with a bottom 26. This is the best solution for tightness (seal). The insertion is exerted by pushing force 40 (see FIG. 12) exerted on the rotation-blocking pin 25. The insertion may continue until the stopper cap 32 reaches the bottom 26 of bore 23.

As can be seen from the final assembly of camera assembly 11 in FIG. 11 and FIG. 12, the flexible fins 36 of the rotation-blocking pin 25 help to maintain the position of lens barrel 12 in camera housing 11. The rotation-blocking pin 25 shown here has a solid shaft 30 (no lobes 34).

FIG. 11 shows the situation when the rotation-blocking pin 25 is in a relaxed condition and the flexible fins 36 get into interference with lens barrel 12. The relaxed condition is defined by the opened inner airgaps 38 (see FIG. 10) of the flexible fins 36 of rotation-blocking pin 25.

FIG. 12 shows the situation when rotation-blocking pin 25 is inserted in bore 23 and maintains the folded flexible fins 36 inside bore 23. This is the best solution for tightness. The inner airgaps 38 (see FIG. 10) of the flexible fins 36 are closed and the flexible fins 36 exert a radial blocking force 42 which pushes the lens barrel 12 tight against the camera housing 11. According to a further embodiment, for balancing the radial blocking force 42 exerted on the lens barrel 12, two or more rotation-blocking pins 25 may be used. The rotation-blocking pins 25 can be disposed in a radial pattern around lens barrel 12.

Figure 13:
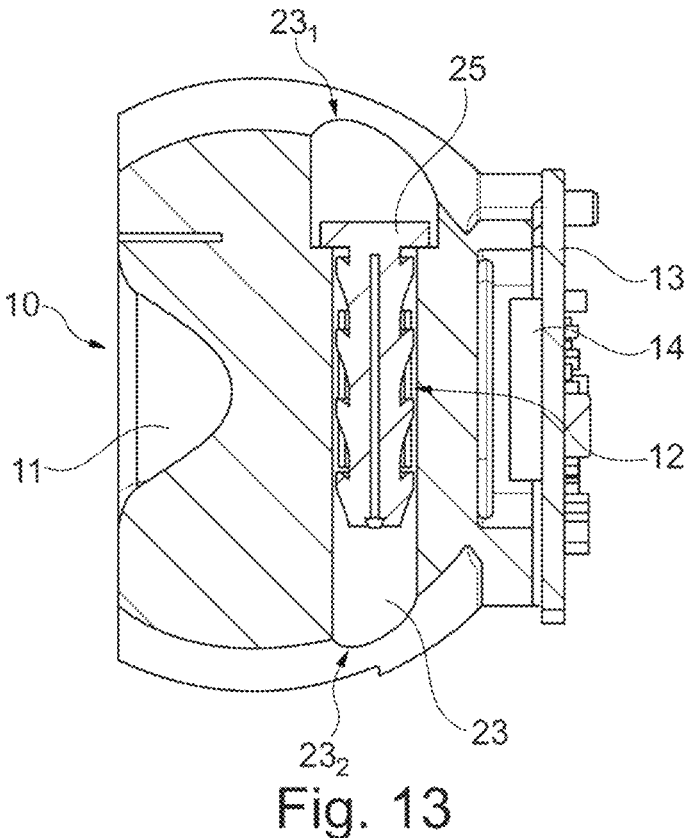
FIG. 13 is an off-center sliced view of the camera assembly, wherein the rotation-blocking pin is inserted in a through-hole.
Figure 14:
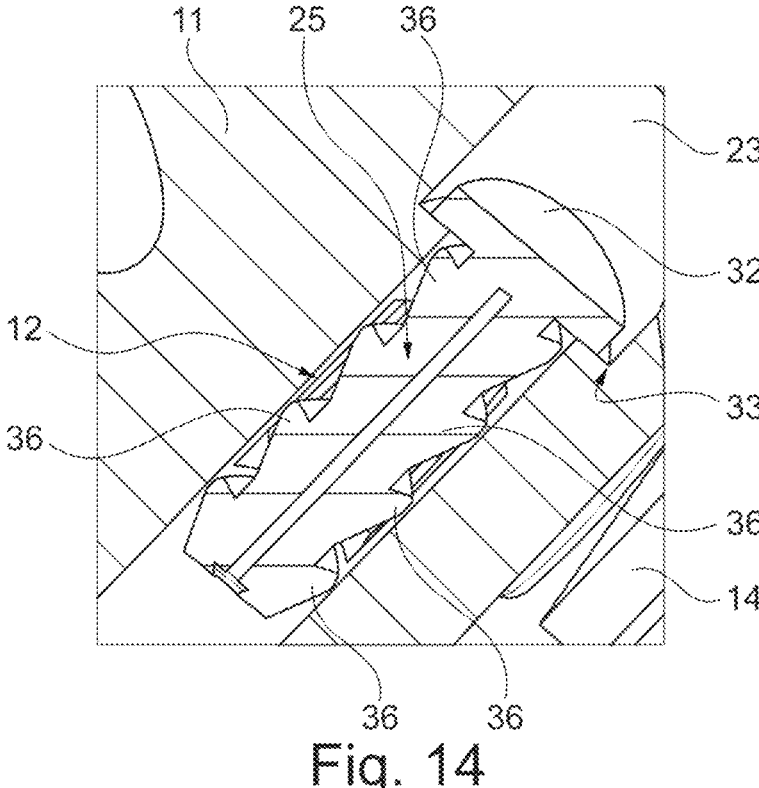
FIG. 14 is an enlarged view of the rotation-blocking pin the through-hole of FIG. 13.

FIG. 13 is an off-center sliced view of camera assembly 10, wherein the at least one rotation-blocking pin 25 is inserted in bore 23, which is configured as a through-hole. FIG. 14 is an enlarged view of the rotation-blocking pin 25 in the bore 23 of FIG. 13. Normally, the force for extracting the rotation-blocking pin 25 is considerably higher than the force for insertion. In a normal use case, however, there is no need to disassemble. If necessary, demounting, can also be ensured by pushing from the second end 23$_2$ (opposite direction) of the bore 23. The movement of the rotation-blocking pin 25 in the bore 23 is limited by a radial rim 33, which gets into contact with a stopper cap 32 of the rotation-blocking pin 25. Here, some of the flexible fins 36 are in force-fitting contact with lens barrel 12 mounted in camera housing 11. Lens barrel 12 is maintained by the flexible fins 36 of rotation-blocking pin 25 in the adjusted position in relation to the optical sensor 14.

Figures 15, 16, 17:
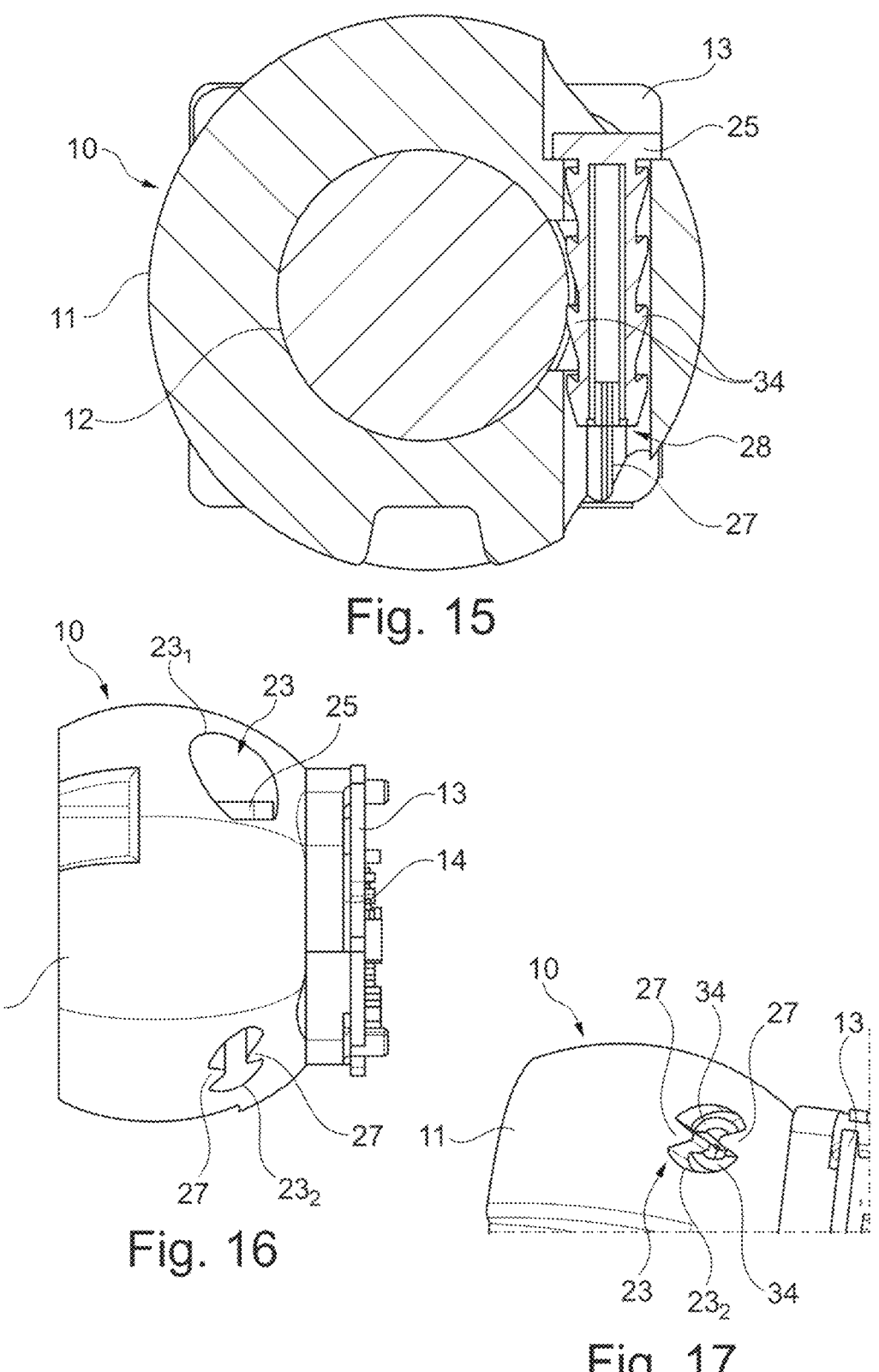
FIG. 15 is a sectional view of the camera assembly, wherein spreading wedges interact with the rotation-blocking pin.
FIG. 16 is a side view of the camera assembly, showing the first and the second end of the through-hole for the rotation-blocking pin.
FIG. 17 is an enlarged perspective view of the camera assembly showing the second end of the through-hole for the rotation-blocking pin.

FIG. 15 is sectional view of the camera assembly 10, wherein spreading wedges 27 interact with the rotation-blocking pin 25. In the embodiment shown here, as the rotation-blocking pin 25 is reaching the end of its insertion travel into the bore 23, the flexible fins 36 of shaft 30 are spread apart by wedges 27 formed inside the wall 28 of bore 23. At the end of the travel of the rotation-blocking pin 25 in the bore 23, the insertion force rises steeply so that the rotation-blocking pin 25 is secured into position.

FIG. 16 is a side view of the embodiment of the camera assembly 10 shown in FIG. 15, wherein the printed circuit board 13 together with the optical sensor 14 (see also FIG. 13) are mounted to camera housing 11. The bore 23, for insertion of rotation-blocking pin 25, showing the first end 23₁ and the second end 23₂ of bore 23, is a through-hole in this embodiment. Rotation-blocking pin 25 is inserted in bore 23. The two lobes 34 of rotation-blocking pin 25 are not seen at the second end 23₂ of bore 23, because the rotation-blocking pin 25 is designed such that a fully inserted rotation-blocking pin 25, including the lobes 34, does not disturb the spherical topology of camera housing 11.

FIG. 17 is an enlarged perspective view of the camera assembly 10 showing the second end 23₂ of the bore 23 (through-hole) for the rotation-blocking pin 25. The lobes 34 of the shaft 30 are spread apart by wedges 27 being close to the second end 23₂ of bore 23 (through-hole). FIGS. 16 and 17 clearly show that the bore 23 is formed such in the camera housing 11, that the spherical topology of the camera housing 11 is not disturbed.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Accordingly, the scope of the invention should be limited only by the claims appended hereto.

What is claimed is:

1. A camera assembly comprising:
   a camera housing,
   a printed circuit board, carrying an optical sensor attached to the camera housing;
   a lens barrel axially surrounded by the camera housing and mounted in the camera housing such that a defined airgap between the lens barrel and the optical sensor is set;
   a bore formed tangentially to the lens barrel, in the camera housing and defining a window to the lens barrel; and
   a rotation-blocking pin with a plurality of flexible fins inserted in the bore, wherein the plurality of flexible fins of the rotation-blocking pin are in a force-fitting contact through the window with a side portion of the lens barrel.

2. The camera assembly as claimed in claim 1, wherein the bore defines a first end and a second end.

3. The camera assembly as claimed in claim 2, wherein the second end of the bore is closed with a bottom formed in the camera housing.

4. The camera assembly as claimed in claim 2, wherein the bore with the first end and the second end is a through-hole.

5. The camera assembly as claimed in claim 1, wherein at least one spreading wedge is formed inside a wall of the bore.

6. The camera assembly as claimed in claim 1, wherein the rotation-blocking pin has a solid shaft and the plurality of flexible fins, wherein the plurality of flexible fins are arranged axially along the solid shaft and each flexible fin of the plurality of flexible fins defines an inner airgap in an unassembled condition of the rotation-blocking pin with the camera housing, whereas in a mounted condition of the rotation-blocking pin with the camera housing, the plurality of flexible fins exert a radial blocking force against the lens barrel and against the camera housing.

7. The camera assembly as claimed in claim 1, wherein the rotation-blocking pin is formed as a split shaft with at least two lobes and the plurality of flexible fins, wherein the plurality of flexible fins are arranged axially along the lobes of the split shaft and each flexible fin of the plurality of flexible fins defines an inner airgap and each of the lobes defines a lobe air gap in an unassembled condition of the rotation-blocking pin with the camera housing, and in a mounted condition of the rotation-blocking pin with the camera housing, the plurality of flexible fins exert a radial blocking force against the lens barrel and against the camera housing.

8. The camera assembly as claimed in claim 7, wherein the bore has at a second end at least one wedge for spreading the lobes of the split shaft apart when the rotation-blocking pin is fully inserted in the bore.

9. The camera assembly as claimed in claim 1, wherein the rotation-blocking pin is manufactured from a plastic or a silicone material.

10. A method for assembling a camera assembly with a camera housing and a printed circuit board, carrying an optical sensor and being attached to the camera housing, and having a lens barrel axially surrounded by the camera housing and mounted in the camera housing such that a defined airgap between the lens barrel and the optical sensor is set;
   comprising the steps of:
   screwing the lens barrel into the camera housing and thereby positioning the lens barrel in relation to the optical sensor; and
   inserting a rotation-blocking pin having a plurality of flexible fins into a bore formed in the camera housing, wherein the bore defines a window to the lens barrel, and wherein the plurality of flexible fins of the rotation-blocking pin are in a force-fitting contact through the window with a side portion of the lens barrel when the rotation-blocking pin is fully inserted in the bore.

11. The method as claimed in claim 10, wherein the insertion of the rotation-blocking pin starts from a first end of the bore and ends when a stopper cap of the rotation-blocking pin is in contact with a radial rim inside the bore.

12. The method as claimed in claim 10, wherein the rotation-blocking pin has a solid shaft and the plurality of flexible fins each define an inner airgap, wherein the inner airgaps of the flexible fins of the rotation-blocking pin are compressed and thereby a radial blocking force is exerted against the lens barrel when the rotation-blocking pin is fully inserted in the bore.

13. The method as claimed in claim 10, wherein the rotation-blocking pin is formed as a split shaft with at least two lobes and the plurality of flexible fins, wherein the flexible fins are arranged axially above the lobes of the split shaft, wherein an inner airgap of each of the flexible fins is compressed and a wedge for spreading the flexible fins and the lobes of the split shaft apart, when the rotation-blocking pin is fully inserted in the bore and thereby exerts a radial blocking force against the lens barrel.

14. A camera assembly comprising:

a camera housing, a printed circuit board, carrying an optical sensor attached to the camera housing;

a lens barrel axially surrounded by the camera housing and mounted in the camera housing such that a defined airgap between the lens barrel and the optical sensor is set;

a bore formed in the camera housing and defining a window to the lens barrel; and a rotation-blocking pin inserted in the bore and being through the window in a force-fitting contact with a side portion of the lens barrel, wherein the rotation-blocking pin has a solid shaft and a plurality of flexible fins, wherein the flexible fins are arranged axially along the solid shaft and each of the flexible fins defines an inner airgap in an unassembled condition of the rotation-blocking pin with the camera housing, whereas in a mounted condition of the rotation-blocking pin with the camera housing, the flexible fins exert a radial blocking force against the lens barrel and against the camera housing.

15. The camera assembly as claimed in claim 14, wherein the bore defines a first end and a second end, and wherein the second end of the bore is closed with a bottom formed in the camera housing.

16. The camera assembly as claimed in claim 14, wherein the bore includes a through-hole.

17. The camera assembly as claimed in claim 14, wherein at least one spreading wedge is formed inside a wall of the bore.

* * * * *